United States Patent [19]

Bergsma et al.

[11] Patent Number: 5,605,175

[45] Date of Patent: Feb. 25, 1997

[54] FLUID RESPONSIVE VENT CONTROL VALVE WITH PEEL-AWAY OPENING ACTION

[76] Inventors: Rudolph Bergsma, 2145 Greenview, Ann Arbor, Mich. 48106; Lindsey E. Waldorf, 7366 Jennings Rd., Whitmore Lake, Mich. 48189

[21] Appl. No.: 448,805

[22] Filed: May 24, 1995

[51] Int. Cl.$^6$ .............................. F16K 24/04; F16K 31/18
[52] U.S. Cl. .............................. 137/202; 137/43; 251/901
[58] Field of Search ....................... 137/43, 202; 251/901

[56] References Cited

U.S. PATENT DOCUMENTS

| | | | |
|---|---|---|---|
| 3,230,965 | 1/1966 | Richards | 137/202 |
| 4,753,262 | 6/1988 | Bergsma | 137/43 X |
| 4,770,201 | 9/1988 | Zakai | 137/202 |
| 4,886,089 | 12/1989 | Gabrlik et al. | 137/202 |
| 5,313,977 | 5/1994 | Bergsma et al. | 137/202 X |

*Primary Examiner*—Gerald A. Michalsky
*Attorney, Agent, or Firm*—Young & Basile, P.C.

[57] ABSTRACT

A fluid-responsive vent control valve for an automobile fuel tank in which a liquid level responsive float controls a flexible, ribbon type valve member to peel it on and off a valve seat to open and close the valve. In one embodiment the float and outlet structure are offset. In an alternate embodiment the float and vent outlet are coaxial, and the ribbon valve is attached between the float and the valve body with a vent closure portion aligned with the outlet and a hinge portion offset from the outlet and connected to the float to provide opening and closing force to the ribbon valve. The outlet is preferably circular, and further includes a roundoff notch which cannot be closed by the pressure differential across the ribbon valve, but requires a final closing movement by the float and closure assist structure to fully close the valve.

10 Claims, 6 Drawing Sheets

FLUID RESPONSIVE VENT CONTROL VALVE WITH PEEL-AWAY OPENING ACTION

FIELD OF THE INVENTION

The present invention relates to fluid-responsive vent control valves for use in vehicle fuel tanks to selectively vent fuel vapor from the tank to a vapor trap such as a carbon canister. More specifically, the present invention is a fluid-responsive vent control valve having a high flow outlet opened by a ribbon type peel-away mechanism.

BACKGROUND OF THE INVENTION

Fluid responsive vent control valves are well known in the art for venting fuel vapor from a vehicle fuel tank to the atmosphere or, more recently, to a vapor recovery system such as a carbon canister. Such valves typically vent the interior of the fuel tank to the carbon canister when the fuel in the tank is below the level of the valve, and are closed by a float when the fuel level rises or in a rollover situation. Closing the valve in response to rising fuel level prevents the overflow of liquid fuel into the carbon canister, for example during refueling. Such valves can be employed as onboard vapor recovery control valves, or as rollover vent valves. If used for onboard vapor control, closure is in response to a full fuel level in addition to surge or rollover and results in a pressure head within the fuel tank and filler pipe to operate automatic shutoff apparatus built into the fuel fill nozzle.

In U.S. Pat. No. 4,753,262 to R. Bergsma, issued Jun. 28, 1988, a rollover vent valve having a venting outlet closed by a peel-away valve disc is disclosed. When liquid fuel reaches the valve a float member is raised to force the valve disc against the vent outlet, thereby closing it to prevent fuel from reaching the canister. In order to ensure positive opening of the valve when the fuel level drops, the float and the structure connecting it to the valve plate operate to circumferentially lever or peel the valve plate off the vent outlet.

As noted in the above-cited patent, increasing the rate of vapor flow from the fuel tank through the valve to the canister requires an increase in the area of the valve vent outlet. Providing the valve with a large vent outlet increases the force acting to maintain the valve in the closed position once the fuel level drops; i.e., the greater the area of the vent outlet, the greater the closing force on the valve plate caused by the tank/canister pressure differential. With a large vent outlet and corresponding valve plate subjected to a substantial tank/canister pressure differential, the float can "hang-up" despite a drop in the fuel level. The valve would then remain closed, resulting in a rapid and undesirable buildup of pressure in the unvented tank.

An alternate approach for opening a valve member from a relatively large vent outlet against the pressure differential thereacross is to provide a flexible, ribbon type valve member to achieve a continuous peeling effect when the float pulls it away from the vent outlet. U.S. Pat. No. 4,770,201 to Zakai illustrates a float-operated faucet or air-purge valve having a flexible membrane valve member progressively detached or peeled from a vent outlet by a float as liquid level drops.

While the Zakai patent generally illustrates a flexible membrane valve with a float-operated peeling action, it is not particularly adapted to the requirements and problems found in automotive fuel tank venting applications. For example, space limitations in vehicle fuel tanks favor compact, small diameter valves; this makes coaxial float/vent outlet arrangements preferable to offset structure as shown in Zakai. The pressure differential and flow conditions in a vehicle fuel tank, and the relationship of these pressure conditions to liquid level, can create extra difficulties with respect to initially opening or peeling the valve member from the vent outlet, and further in wrinkling or bunching up at various stages of operation. Also, it is increasingly desirable to provide an initial shutoff indication to the person refueling the tank, with allowance for a few "round off" clicks on the filler nozzle for final shutoff. These and other problems encountered with peel-away valves in the fuel tank environment are solved by the following invention.

SUMMARY OF THE INVENTION

The present invention is a fluid-responsive, high volume vent valve for use in the fuel tank of a vehicle to vent fuel vapor from the tank to a vapor canister. The valve of the present invention provides a positive closing seal for the vent outlet in response to a full fuel level, and in rollover situations, as well as a powerful opening force to break that seal and open the valve when the fuel recedes or the valve returns to a normal attitude.

The above objects are achieved with a hollow vent valve mounted in the wall of a vehicle fuel tank, having a lower portion with a venting inlet in the interior of the tank, and an upper portion with a high volume venting outlet connected to the vapor canister. A float member is mounted in the lower portion of the valve body to ride up and down between a lower open position and an upper closed position in response to liquid fuel level or a rollover situation. The float controls a flexible, ribbon type peel-away valve element associated with the vent outlet to open and close the vent.

The valve element is a flexible, ribbon-like seal connected at one end to the valve body, and at the other end to the float. The closure portion of the valve element conforms to the vent outlet to tightly close it when the float is raised to the closed position. In a first embodiment the vent outlet preferably has a length greater than its width to define a longitudinal lever arm along which the ribbon seal is peeled off. The float and vent outlet are axially offset, allowing the float to pull the ribbon off the vent outlet with no frictional binding effect on the float.

In a second embodiment, which is preferred for onboard vapor recovery, the float and vent outlet are essentially coaxial. The flexible ribbon valve member includes a central valve closure portion, a first end connected to the float on one side of the vent outlet, and a second end connected to the valve body on the opposite side of the vent outlet. The float further includes closure assist structure which engages and helps seal the valve closure portion of the ribbon member against the coaxial vent outlet to a closed position, even under no or low pressure differential conditions. In a further preferred embodiment the vent outlet includes a single large opening with a small roundoff notch, the roundoff notch lying within the operating dimensions of the closure assist structure on the float. As the ribbon element is sequentially presented by the float to close off the vent outlet, an initial shutoff occurs when all but the roundoff notch is closed. Pressure alone is insufficient to seal the roundoff notch, allowing a final roundoff of fuel tank level. Final shutoff occurs only after the fuel level forces the float and its closure assist structure upward to seal the roundoff notch.

Other advantageous features and embodiment of the present invention are described in the following description.

DETAILED DESCRIPTION OF THE DRAWINGS

Figure 1:
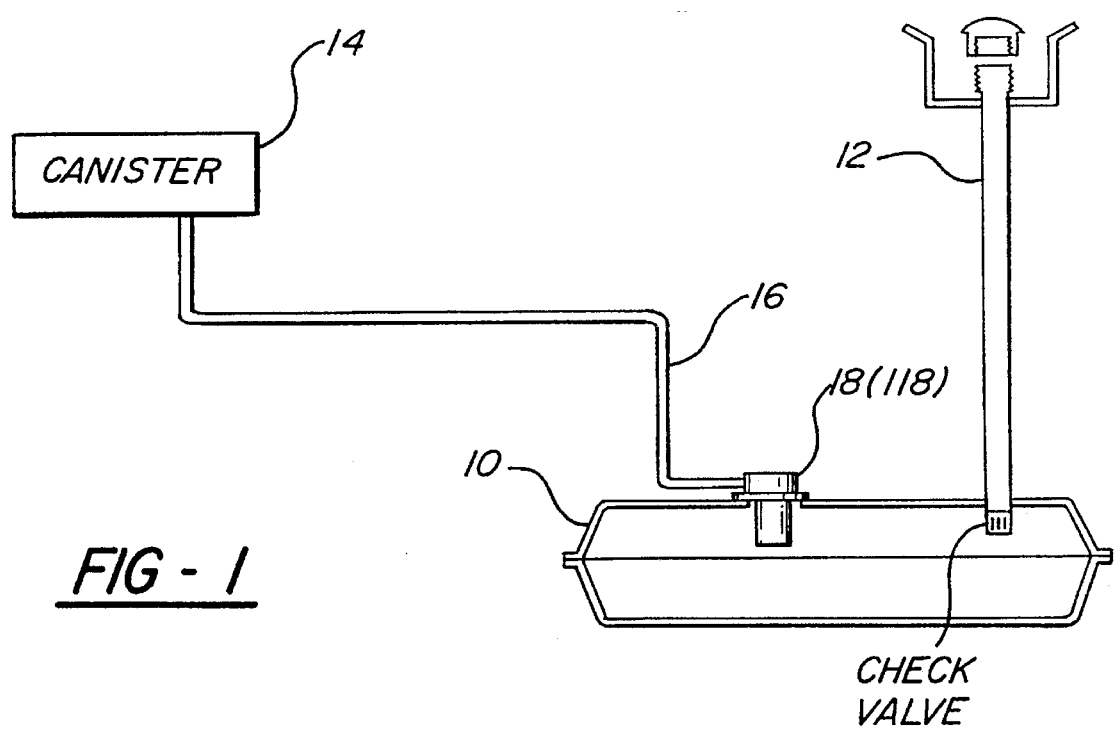
FIG. 1 is a schematic view of a vehicle fuel system employing a valve according to the present invention.
Figure 2:
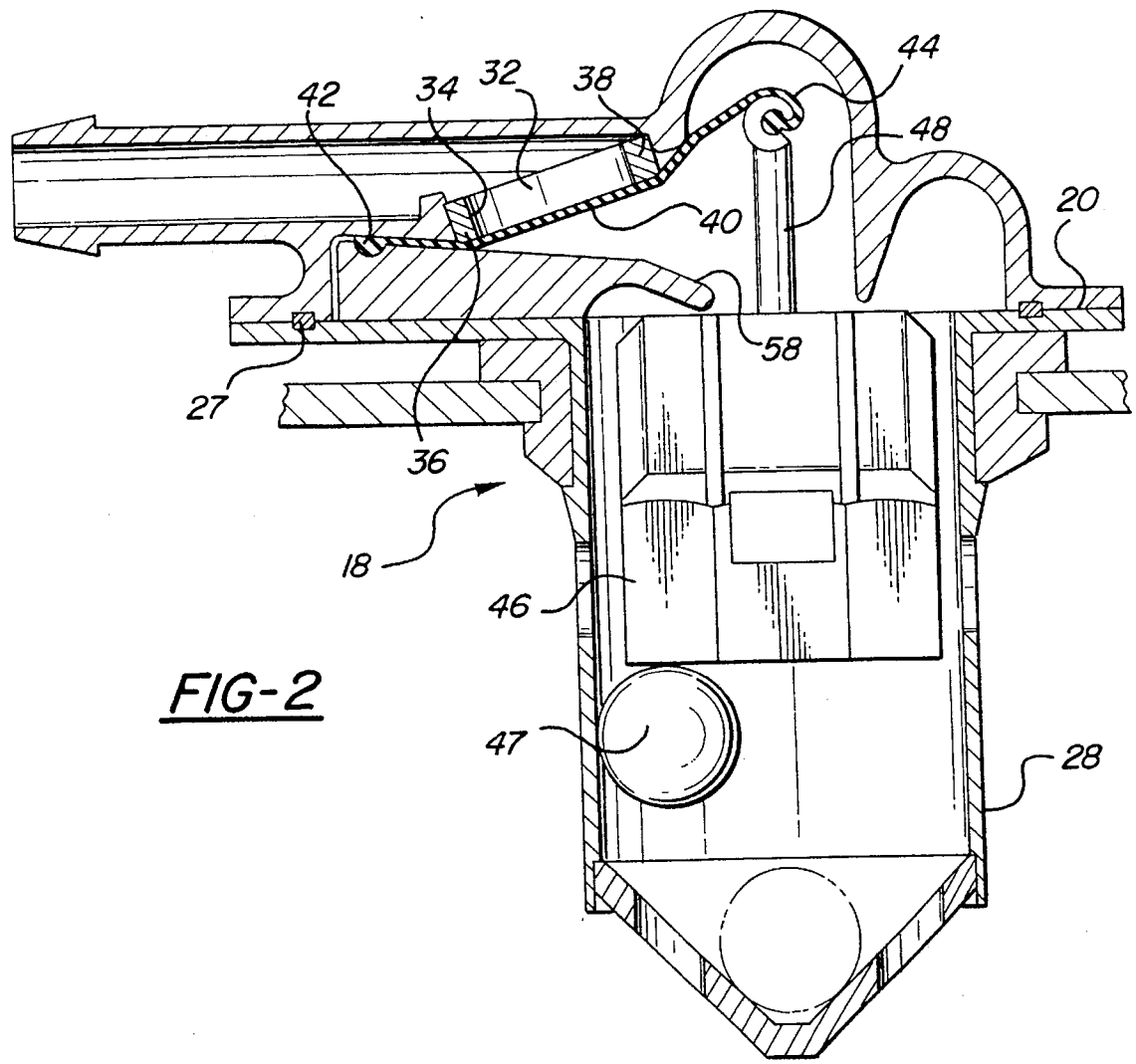
FIG. 2 is a side section view of one embodiment of the valve of the present invention mounted in the wall of a fuel tank.

Referring now to FIGS. 1 and 2, a rollover vent control valve according to a first embodiment of the present invention is generally shown by the reference numeral 18, mounted in the fuel tank 10 of a vehicle fuel system including a filler pipe 12 for introducing fuel into the fuel tank and a vapor canister 14 to which fuel vapor is vented from the tank through the valve 18 via a vent line 16. When the fuel level in the tank is below valve 18, valve 18 is open and provides high volume venting of fuel vapor to the canister through a control valve. When liquid fuel reaches valve 18 due to fuel slosh or surge, or when the attitude of the valve is upset during a rollover situation, the valve responds by closing, thereby shutting off flow to the vapor canister and protecting the canister from saturation. In the rollover scenario, gravity, and optimally additional structure, aids in closing the valve independently of the effects of liquid fuel; i.e., the valve will reliably close in a rollover situation whether or not it is submerged in fuel.

As shown in FIG. 2, valve 18 comprises a hollow valve body 20, preferably molded from a fuel-resistant plastic such as an acetal resin or nylon material, although it will be apparent to those skilled in the art that other materials can be used. Valve body 20 is mounted in a mating recess formed in the wall of the fuel tank, and sealed with respect thereto, for example by a grommet-type seal (not shown). A suitable method for securing the valve to the fuel tank in a liquid- and vapor-tight manner is disclosed in U.S. Pat. No. 4,960,153, issued Mar. 13, 1990.

Hollow valve body 20 includes an upper portion 26 projecting above the wall of the fuel tank when valve 18 is mounted thereto, and a lower portion 28 defining a float chamber extending into the interior of the fuel tank. Upper portion 26 in the illustrated embodiment is fastened in fluid tight manner to the lower portion 28 as shown at 27 in any suitable manner known in the art, for example, adhesively bonded, crimped or integrally molded with lower portion 28. Lower portion 28 is shown in the drawings as a hollow, essentially cylindrical portion communicating with the interior of the fuel tank via radial venting ports 30 and 31. Valve 18 communicates with the vapor canister via a connector 33 formed in upper portion 26 and a vent line 16 leading from connector 33 to the canister. Accordingly, fuel vapor from the interior of the fuel tank is vented to the vapor canister through a flow path comprising radial venting ports 30 and 31, the interior of lower portion 28, vent outlet 32, connector 33 and vent line 16.

Figure 3:
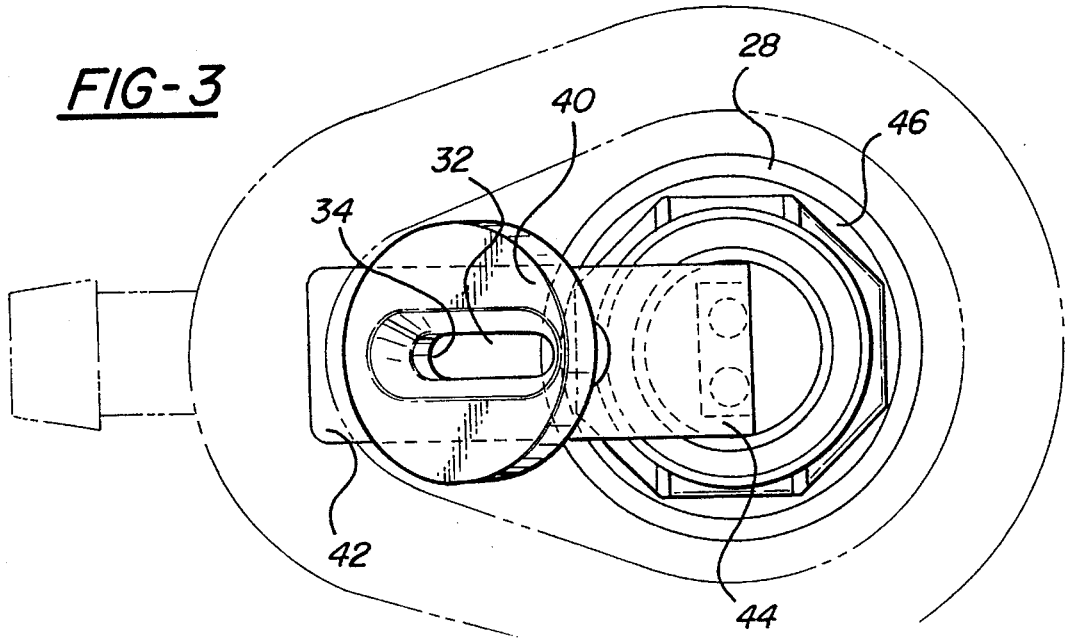
FIG. 3 is a plan view of the valve of FIG. 2.
Figure 4:
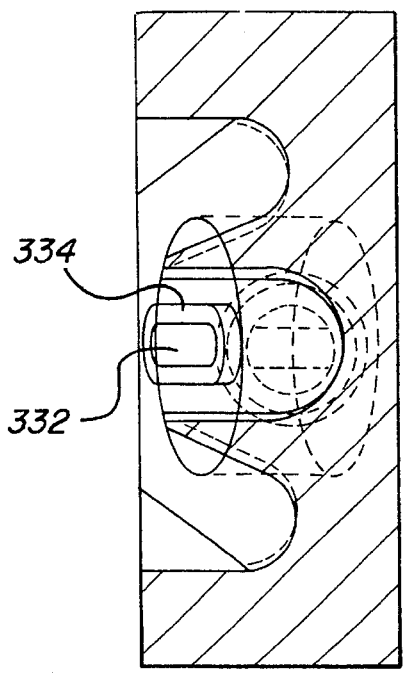
FIG. 4 is a side section view of the vent outlet area of the valve of FIG. 2.
Figure 5:
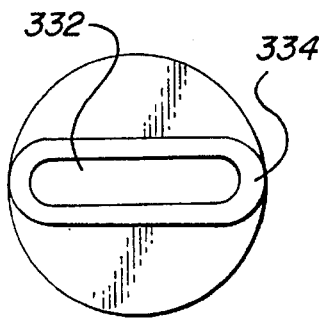
FIG. 5 is a plan view of the vent outlet of FIG. 2.

Referring to FIGS. 2 to 4, the details of the valve element and vent outlet in a first embodiment of the invention are set forth. Vent outlet 32 is defined by a valve seat 34 in upper portion 26 of the valve body. Valve seat 34 comprises a raised flange extending in the direction of the interior of lower portion 28 of the hollow valve body. In the illustrated embodiment, it can be seen that valve seat 34 lies in a plane inclined or angled from the horizontal, running from a lower end 36 to an upper end 38. Vent outlet 32 is defined by the oval valve seat 34 as a long, narrow oval whose length is substantially greater than its width, such that it essentially takes the form of a slot having rounded ends.

Float 46 in FIGS. 2-6 can be lighter or heavier than fuel, or neutrally buoyant, so long as it is mass balanced alone or with other structure to close when submerged in fuel or in a rollover situation. Rollover structure 47, shown here as a well-known ball and ramp mechanism, can likewise take other forms so long as it works in complementary fashion with float 46.

A flexible, peel away ribbon valve element 40 is fastened at one end 42 to the interior of valve body 20 adjacent lower end 36 of valve seat 34. At its other end 44 valve element 40 is connected to float 46 adjacent upper end 38 of valve seat 34. Valve element 40 has a length greater than that of the valve seat such that its end 44 extends beyond upper end 38 of valve seat 34 into the interior of the hollow valve body 20. As illustrated, valve element 40 is a rectangular sheet of pliable material, for example fluorosilicon rubber, having an area sufficient to completely cover vent outlet 32 and valve seat 34. The flexible nature of valve element 40 allows it to effectively pivot about its end 42 fastened to the interior of the valve body 20. The longitudinal axis of valve element 40 is essentially aligned with vent outlet 32 and valve seat 34, as best shown in FIG. 3.

A shallow guide ramp 58 is formed in lower portion 28 of the valve body, having a width corresponding to the width of ribbon valve element 40. Guide ramp 58 provides a shallow ramp surface for supporting the ribbon valve element 40 as hereinafter described.

Figure 6:
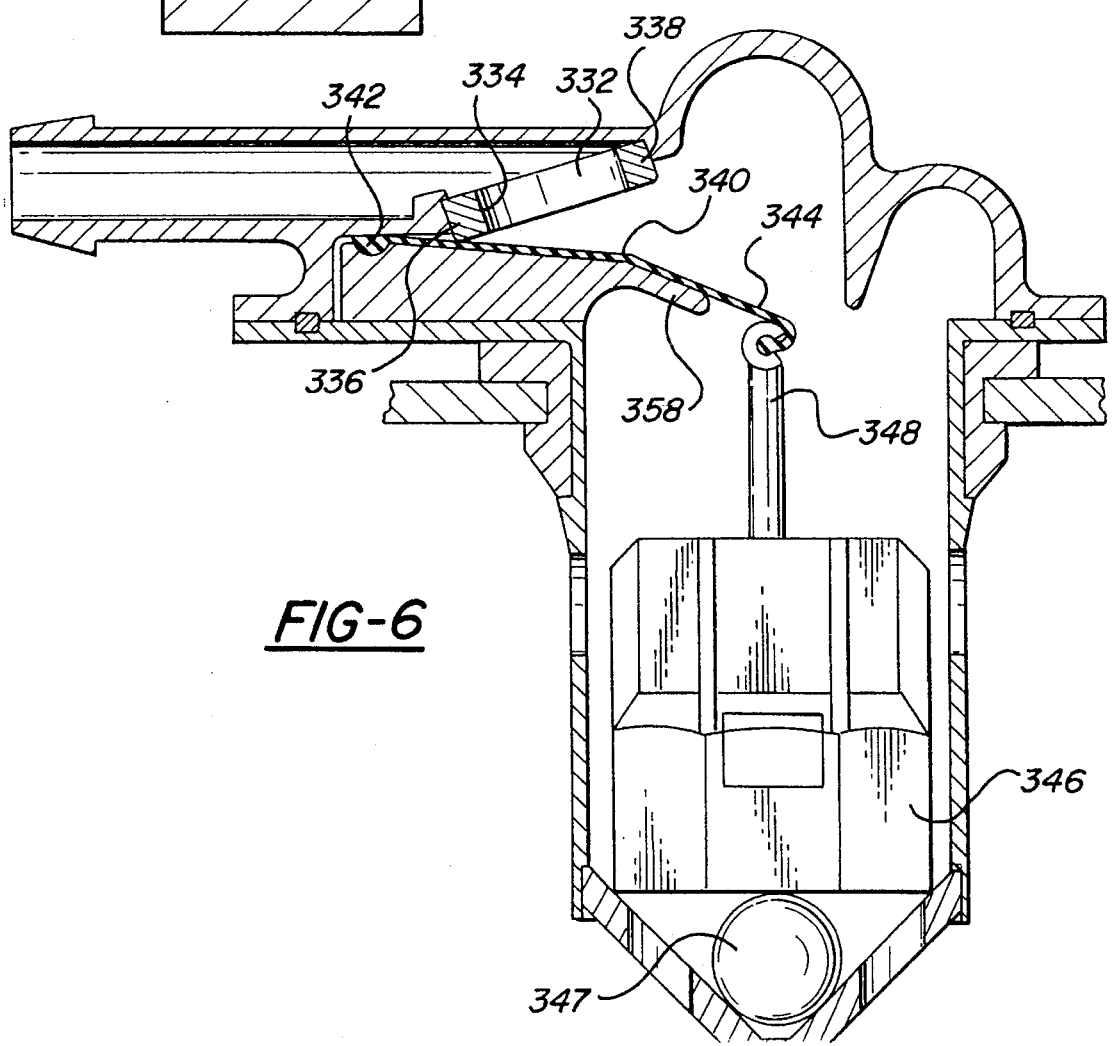
FIG. 6 is a side section view of the valve of FIG. 2 in an open condition.

As float 46 is raised and lowered in response to fuel surge or a rollover situation, ribbon valve element 40 is correspondingly pulled up or down by control arm 48 extending from float 46. With float 46 in the fully raised position shown in FIG. 2, control arm 48 has pulled ribbon valve element 40 to the closed position in which the valve element covers and seals valve seat 34. In its lowermost position as shown in FIG. 6, float 46 has peeled valve element 40 off valve seat 34 and down onto guide ramp 58 to the open venting position.

The longitudinal axis of valve seat 34 is aligned with the longitudinal axis of valve element 40 as best shown in FIG. 3. From the closed position shown in FIG. 2, valve element 40 is accordingly peeled off valve seat 34 in the longitudinal direction, beginning at upper end 38 of the valve seat. The long lever arm and slot-like oval opening of vent outlet 32 and valve seat 34 create a strong mechanical advantage which peels the ribbon valve element 40 away from valve seat 34 despite pressure in the fuel tank which resists the opening of the valve.

Further mechanical advantage is obtained with free end 44 of ribbon valve element 44 extending beyond upper end 38 of valve seat 34. When the valve is in the closed position as shown in FIG. 2, there is a tank/canister pressure differential acting in the area of valve element 40 overlying vent outlet 32. This tank/canister pressure differential tends to hold the valve in the closed position, since tank pressure is typically greater than atmospheric canister pressure. Free end 44 of ribbon valve element 40 extending beyond upper end 38 of valve seat 34 has no pressure differential acting across it to keep it closed; i.e., free end 44 of valve element 40 has tank pressure acting on both sides. Accordingly, upper end 38 and free end 44 of the ribbon valve element define an initial pivot point and lever arm through which the float acts to initially break the seal between valve element 40 and valve seat 34. Once the seal has been initially broken by this first independent lever arm action, the valve element 40 is peeled from valve seat 34.

The opening of ribbon valve element 40 therefore comprises a two-step motion: the initial pivotal break effected by the independent lever arm motion of free end 44 of the ribbon valve element about the pivot point of upper end 38 of valve seat 34; and, the subsequent integral lever-type peeling action of the entire valve element 40. The flexible nature of valve element 40 enables it to form a tight seal with valve seat 34, as well as providing for the powerful peel away opening force. However, when in the open, relaxed position, the flexible ribbon might tend to go slack and bunch up or otherwise deform so as to affect the proper functioning of the valve. Accordingly, curved guide ramp 58 serves to properly tension and support ribbon valve element 40 when the valve is in the open position. In this manner the open valve element remains unaffected by pressure changes within the valve which might otherwise tend to deform it. Liquid fuel is also prevented from collecting on the valve element should it somehow reach that level within the valve, since it simply drains off the surface of valve element 40 conforming to guide ramp 58.

The rounded surface of upper end 38 of valve element 34 permits a tight seal at that point between the valve seat and the valve element. Additionally, it permits the free end 44 of the valve element 40 to be wrapped around or pulled upwardly about end 38 by control arm 48 of the float beyond the plane of valve seat 34 and the remainder of the valve element 40. This again ensures a tight seal and gives a head start to the lever action needed to unseal the valve element when the float drops with the liquid fuel level.

In a further embodiment of the ribbon valve element, not shown, valve element 40 is reinforced along its lower surface opposite vent outlet 32 by a number of tracks or ribs formed integrally thereon. This serves to stiffen valve element 40 in the vicinity of vent outlet 32 to prevent it from being forced into the vent outlet past valve seat 34 by tank pressure acting on its lower surface.

Referring now to FIGS. 7–12, an alternate and preferred embodiment of a ribbon type peel-away valve is generally designated at reference numeral 118. This valve is particularly suited for use as a fluid responsive onboard vapor control valve.

Valve 118 comprises an upper portion 126 projecting above the wall of the fuel tank when valve 118 is mounted thereto, and a lower portion 128 defining a float chamber extending into the interior of the fuel tank. Upper portion 126 in the illustrated embodiment is preferably molded with lower portion 128 although it could be mechanically secured by heat stakes 127, adhesively bonded, or crimped. Lower portion 128 as shown in the drawings is a hollow, roughly cylindrical portion communicating with the interior of the fuel tank via axial ports 130 and subsequently through radial port 130a with a slosh-preventing baffle. A vent outlet 132 defined by a valve seat 134 provides vapor communication between lower portion 128 and upper portion 126. Valve 118 communicates with the vapor canister via a connector 133 formed in upper portion 126 and a vent line (FIG. 1) leading from connector 133 to the canister. Accordingly, fuel vapor from the interior of the fuel tank is vented to the vapor canister through a flow path comprising venting ports 130, the interior of lower portion 128, vent outlet 132, connector 133 and the vent line.

Figures 11, 12:
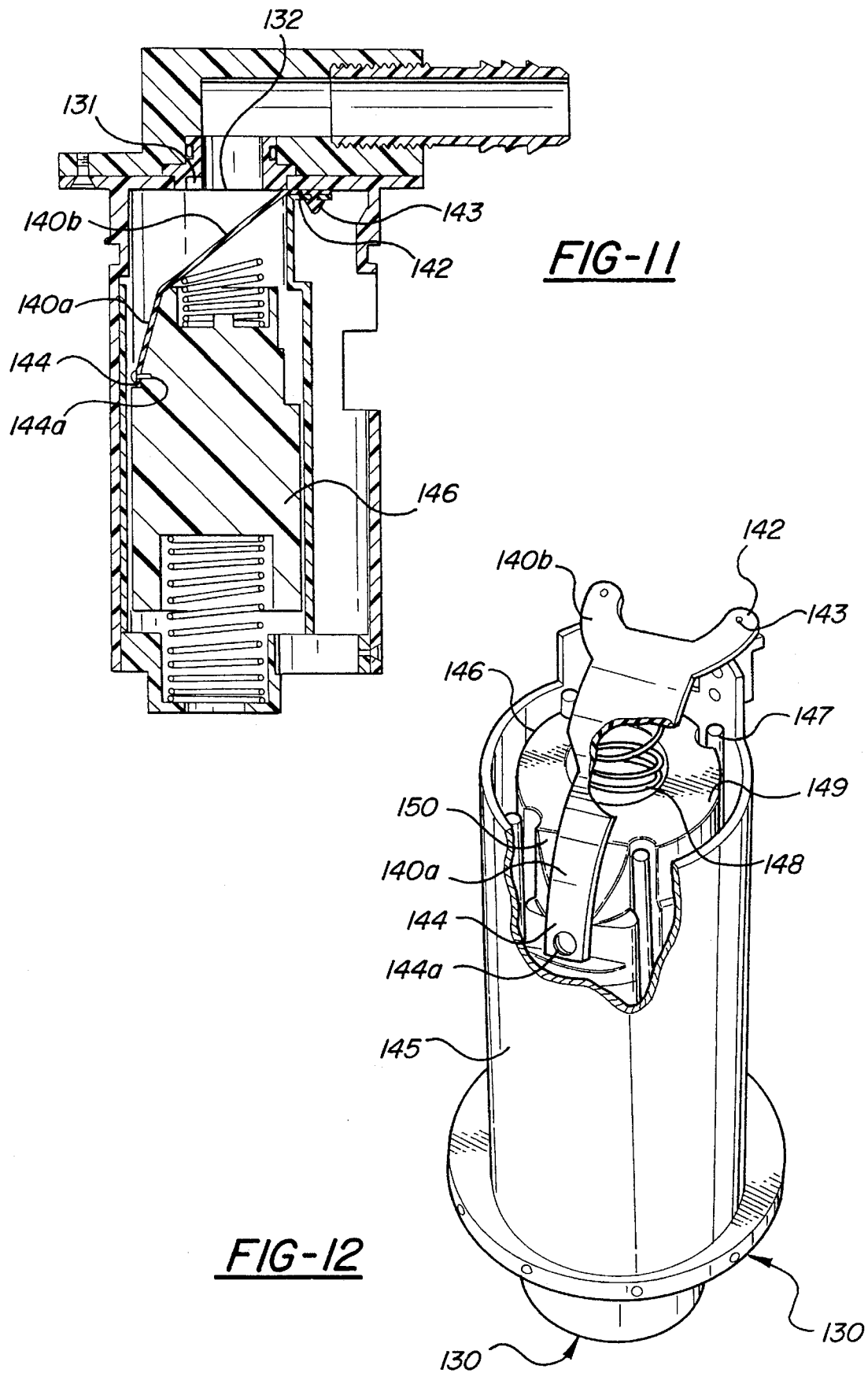

A float 146 is located in lower portion 128 of valve 18 for vertical movement between a closed position against valve seat 134 (FIG. 7) and an open position (FIG. 11). Float 146 may be heavier or lighter than fuel, or of neutral buoyancy, and may or may not include rollover assist structure such as a weight or spring 148, depending on its buoyancy. The orientation of float 146 is maintained by a guide housing 145 inserted in the float chamber and provided with guide pins 147 (FIG. 12) mating with grooves formed in float 146.

A flexible, peel-away ribbon valve element 140 is fastened at one end 144 to float 146, for example with a small screw or heat stake 144a, while the other end 142 is attached to the valve body via a snap-fit connection between the valve element and clip structure 143 on the guide housing. Valve element 140 preferably comprises a fuel-resistant rubber or rubber-like material. The shape of valve element 140 and its connection to the valve body (via guide housing 145) are best shown in FIG. 12.

Unlike the embodiment of FIGS. 2–6, vent outlet 132 and float 146 are essentially co-axial, along with the central closure portion 140a of valve element 140. This results in a valve which is more compact then the valve of FIGS. 2–6. However, valve 118 in FIGS. 7–12 incorporates a number of structural features which allow proper opening and closing of the ribbon valve element with a coaxial float and vent outlet.

The upper, ribbon-contacting portion of float 146 includes an annular shoulder 149 surrounding a closure spring 148, fastened to the float and contained within the shoulder. On one side of float 146 aligned with the hinge portion 140b of ribbon valve element 140, the outer surface of the shoulder 149 is formed as a rounded, inclined ramp section 150 extending to the point at which valve element 140 is attached to float 146.

Vent outlet 132 is an essentially circular, relatively large opening. This is in contrast to the elongated, slot-like nature of the vent opening 32 in the embodiment of FIGS. 2–6, and allows very large flow rates in a more space-efficient valve. Vent outlet 132 further includes a small roundoff notch 131 aligned with the hinge side of the ribbon valve element. The roundoff notch is the last portion of the vent outlet covered by the ribbon valve element, as described below.

Figure 7:
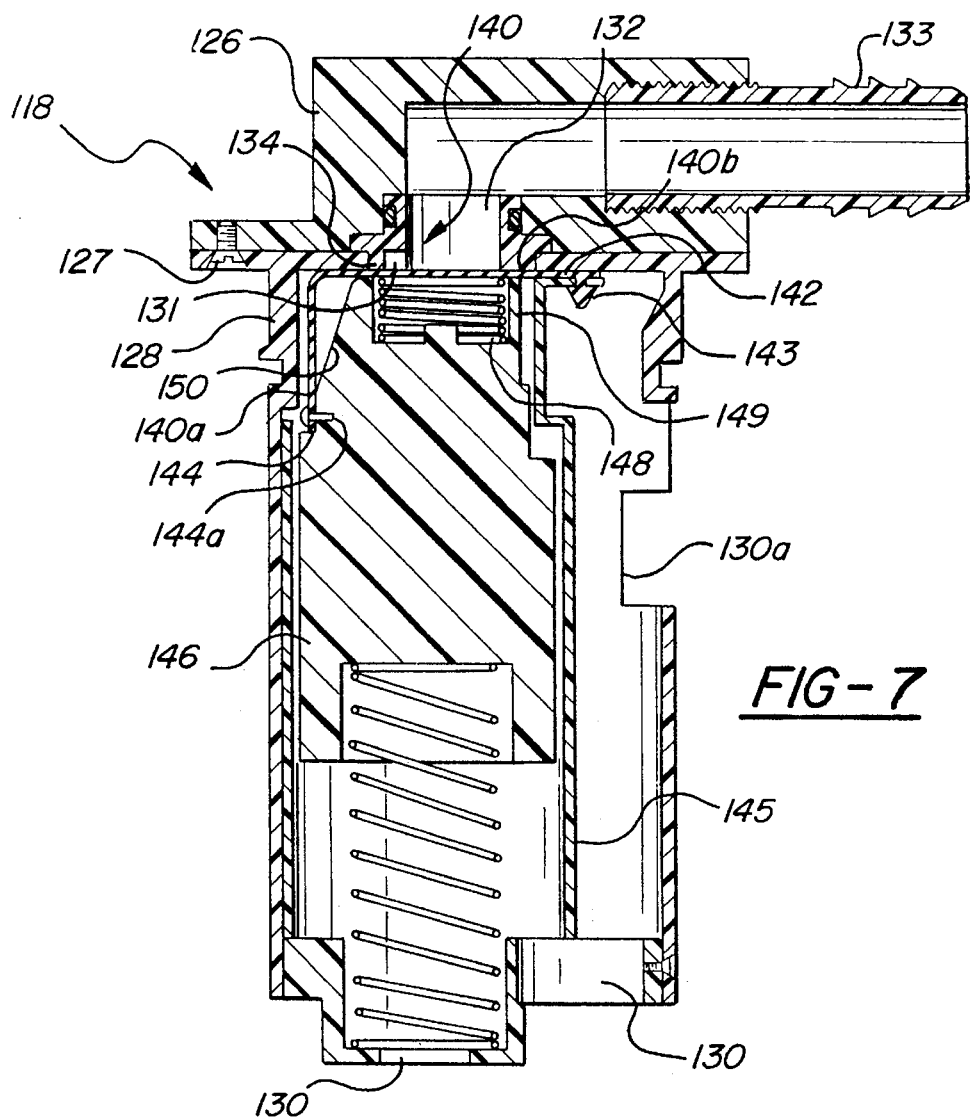
FIG. 7 is a side section view of a preferred embodiment of the valve according to the present invention, particularly useful as an onboard vapor control valve.
Figure 8:
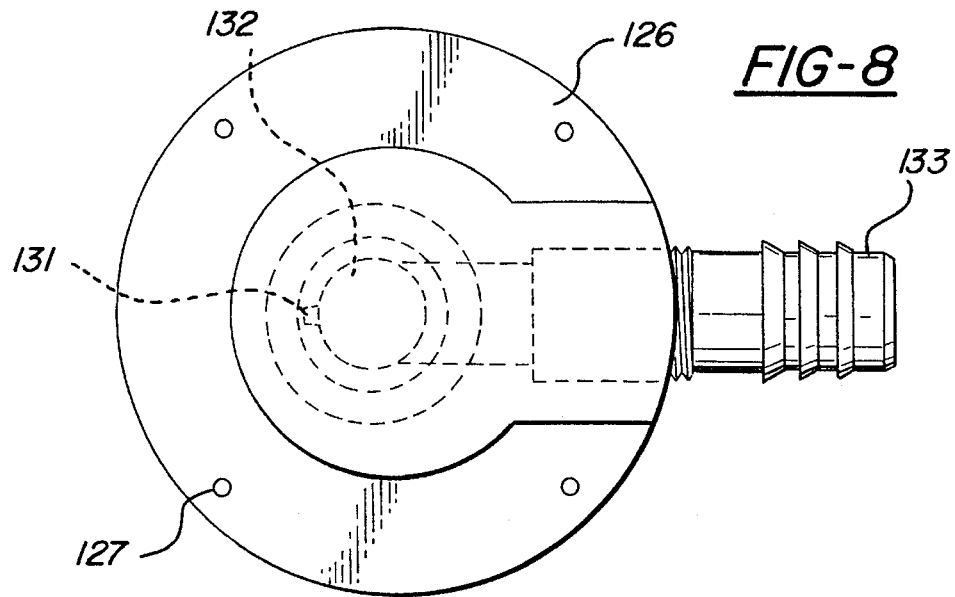
FIG. 8 is a plan view of the valve of FIG. 7.
Figure 9:
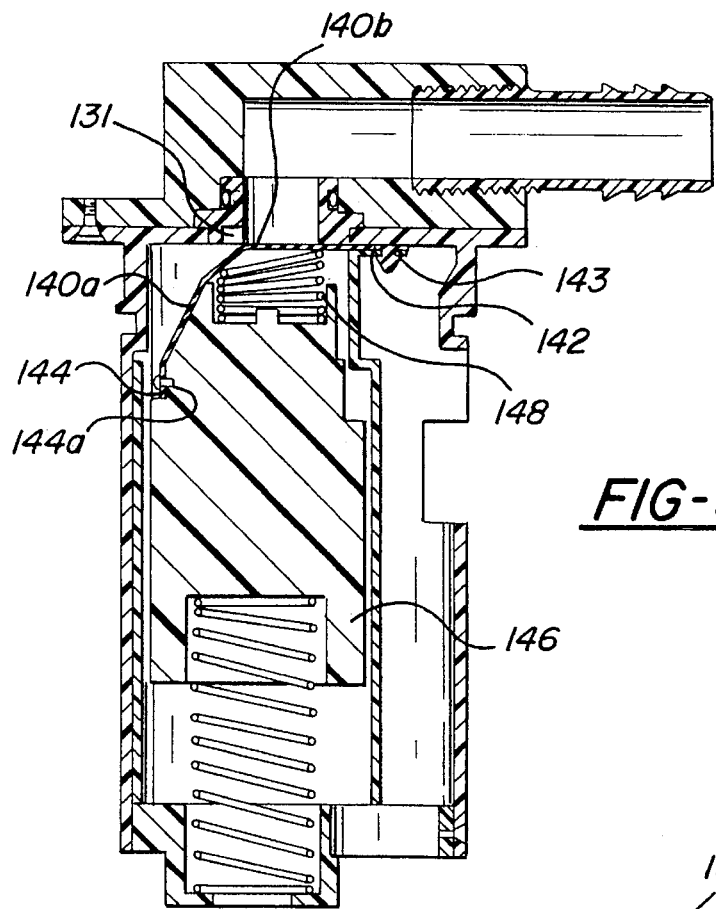
FIGS. 9-11 are side section views of the valve of FIG. 7 in various stages of opening; and, FIG. 12 is a perspective view of the interior valve member and float components of the valve of FIG. 7.
Figure 10:
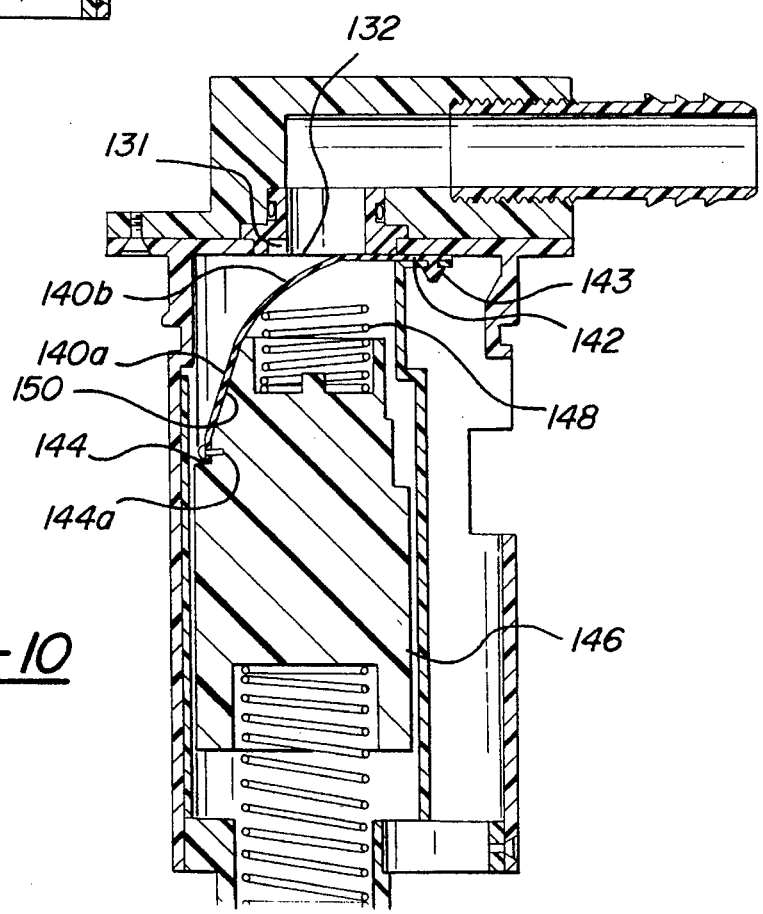

FIG. 7 illustrates valve 118 in a fully closed position, where a full fuel level in the tank has forced float 146 upwardly against valve seat 134 to firmly seal outlet 132 with ribbon valve element 140. Valve 118 may also be closed as shown in FIG. 7 in a rollover situation, in which the effects of liquid fuel, gravity and any rollover or bias structures such as spring 148 force float 146 toward valve seat 134. FIGS. 9–11 illustrate three stages in the opening of valve 118 as liquid fuel level and float 146 drop.

Referring to FIG. 9, as the liquid fuel level drops and float 46 begins to move downwardly, the hinge portion 140b of ribbon valve element 140 is pulled downwardly by the float to begin peeling the flexible ribbon from valve seat 134.

Because successive portions of valve element 140 are continuously peeled from vent outlet 132, it is not necessary to overcome the force of the pressure differential acting on closure portion 140a across the entire area of vent outlet 132. This allows the use of a larger vent outlet with greater flow rate. The offset attachment of ribbon 140 to float 146 helps to properly tension ribbon valve element 140 throughout the opening operation, providing an opening moment which in FIGS. 2–6 is provided by the offset float and elongated, inclined vent outlet. Ramp 150 allows maximum float travel as it moves downwardly, without binding up with the ribbon. Additionally, ramp 150 further tensions loose ribbon material in the full open condition of FIG. 11 to prevent it from being affected by vapor flow through the valve. Because spring 148 protrudes a small distance past shoulder 149, for example 0.10 inches, and because the length of hinge portion 140b is greater than ramp 150, the initial peeling action from valve seat 134 only begins after the float has dropped far enough to begin tensioning hinge portion 140b. This assures a maximum opening moment for the initial peel or break from valve seat 134, particularly where a pressure differential across the ribbon tends to hold closure portion 140a against the valve seat.

An additional aid in the initial opening action is the roundoff notch 131, which is placed in reference to the ribbon valve element such that pressure differential alone is insufficient to firmly seal the ribbon against valve seat 134; i.e., the ribbon valve element begins to separate or become loose in the region of the roundoff notch as soon as the peel away force of the ribbon counters the sealing force of closure spring 148. As shown in FIG. 9, the ribbon valve element in the vicinity of roundoff notch 131 has only a light closure force from spring 148 plus tank/canister pressure differential to hold it closed which is insufficient to hold the valve in a fully closed position.

Referring now to FIGS. 10 and 11, as the liquid fuel level and float 146 drop further, the weight of the float continues to peel the ribbon valve element 140 from valve seat 134 until the valve is completely open as shown in FIG. 11.

Now beginning at FIG. 11 and returning in reverse order to FIG. 7, as the fuel level and float 146 begin to rise during refueling, the force exerted on hinge portion 140b by the laterally offset ramp 150 serves to pull ribbon valve element 140 closed across valve seat 134. This prevents the ribbon material from bunching or wrinkling when it is fully closed.

Referring to FIG. 9, the novel ribbon valve and vent outlet structure provide a controlled, two stage shutoff which recommends the valve for use as a fluid responsive onboard vapor control valve. Float 146, ribbon valve element 140 and roundoff notch 131 are calibrated such that the filler nozzle shutoff is activated when all but the round- off notch is closed. This initial shutoff signals the person refueling the tank that it is nearly full, without spitback and with reduced chance of premature actuation of the automatic filler nozzle shutoff. At the same time, the tank/canister pressure differential across the ribbon valve element is not sufficient to finish closing off the roundoff notch, allowing the operator a few confirmatory roundoff "clicks" of the filler nozzle before final shutoff. Final closure of the roundoff notch is accomplished by final movement of the float. The last few roundoff clicks force the float this remaining distance against the force of spring 148 to finally and firmly seal the ribbon valve element against the valve seat.

Valve 118 allows for high vapor flow rates to vent the fuel tank even when partially closed as shown in FIG. 9, for example. Flow will always occur when the float 146 and spring 148 are below the initial shutoff point, even under high tank pressures, due to the roundoff notch 131 and its function in preventing premature pressure-induced closure.

Referring to FIGS. 7 and 12, closure spring 148 is preferably a relatively weak spring with enough force to flatten the flexible ribbon against the valve seat, especially at low or no pressure differential conditions. Otherwise, particularly at such low or no pressure differential conditions, the valve may sometimes wrinkle or bunch up and prevent an effective seal.

The diameter of spring 148 is at least great enough to close the round off notch for final shutoff. The spring is preferably enclosed within the annular shoulder 149 on float 146, and further extends vertically beyond the shoulder enough to seal the ribbon valve without interfering with fuel roundoff and the peel-away tension exerted by ramp 150.

It is to be understood that the foregoing description is of illustrative embodiments in accordance with 35 USC §112, and is not intended to be limiting, as many embodiments of the invention are possible within the scope of the appended claims.

We claim:

1. A liquid-responsive vent control valve for mounting on a vehicle fuel tank to selectively vent fuel vapor from the tank to a vapor trap, the valve comprising:

a hollow valve body having a fuel vapor inlet communicating with the tank interior and a high flow fuel vapor tank outlet communicating with the vapor trap;

valve means associated with the vent outlet, the valve means movable between an open venting position and a closed non-venting position;

fuel level responsive float means in the hollow valve body connected to the valve means to open and close the valve means in response to the level of liquid fuel in the tank; wherein, the valve means comprises a flexible ribbon valve element connected at one end to the valve body and at the other end to the float means such that the float means peels the ribbon valve element in continuous fashion on and off the valve seat, and further wherein the float means and the vent outlet are coaxial.

2. A valve as defined in claim 1, wherein the ribbon valve element is attached at a first end to the float means on a first side of the vent outlet and at a second end to the valve body on a second opposite side of the vent outlet, and includes a valve closure portion between the first and second ends.

3. A valve as defined in claim 2, wherein the float means includes valve closure means aligned with the vent outlet for contacting the valve closure portion of the ribbon valve element and forcing it into secure sealing engagement with the vent outlet.

4. A valve as defined in claim 3, wherein the valve closure means comprise an unyielding surface engaging the ribbon valve element in a fully closed condition, and a yielding spring member engaging the ribbon valve element prior to the unyielding surface and subsequently being compressed until the unyielding surface contacts the ribbon valve.

5. A valve as defined in claim 1, wherein the ribbon valve element includes a valve closure portion aligned with the vent outlet and a hinge portion laterally offset from the vent outlet, and the float means includes a ramp portion cooperating with the hinge portion when the float means moves toward an open position to enable the ribbon valve element to fully open the vent outlet.

6. A liquid-responsive vent control valve for mounting on a vehicle fuel tank to selectively vent fuel vapor from the tank to a vapor trap, the valve comprising:

a hollow valve body having a fuel vapor inlet communicating with the tank interior and a high flow fuel vapor tank outlet communicating with the vapor trap;

valve means associated with the vent outlet, the valve means movable between an open venting position and a closed non-venting position;

fuel level responsive float means in the hollow valve body connected to the valve means to open and close the valve means in response to the level of liquid fuel in the tank; wherein, the valve means comprises a flexible ribbon element connected at a first end to the valve body and a second end to the float means such that the second end is lower than the first end in both the open venting position and the closed non-venting position, the first and second ends of the ribbon valve element being located on opposite sides of the vent outlet and the ribbon element further including a closure portion aligned with the vent outlet, and the float means being aligned with the vent outlet such that the float means forces the ribbon valve closure portion against the vent outlet in the closed non-venting position.

7. A valve as defined in claim 6, wherein the float means includes valve closure means comprising a spring member engaging the ribbon valve element prior to the closed non-venting position.

8. A valve as defined in claim 7, wherein the vent outlet includes a roundoff notch.

9. A liquid-responsive vent control valve for mounting on a vehicle fuel tank to selectively vent fuel vapor from the tank to a vapor trap, the valve comprising:

a hollow valve body having a fuel vapor inlet communicating with the tank interior and a high flow fuel vapor tank outlet communicating with the vapor trap;

valve means associated with the vent outlet;

fuel level responsive float means in the hollow valve body connected to the valve means to open and close the valve means in response to the level of liquid fuel in the tank; wherein, the valve means comprises a flexible ribbon valve element connected at one end to the valve body and at the other end to the float means such that the float means peels the ribbon valve element in continuous fashion on and off the valve seat between an open venting position in which the float means has pulled the ribbon valve element completely free of the vent outlet, an initial shutoff position in which the float means through its contact with the first end of the ribbon valve element has raised the ribbon valve element to a point where pressure differential across the vent outlet has substantially but not fully closed the vent outlet, and a full shutoff position in which force exerted by the float means against the ribbon valve element fully closes the vent outlet.

10. A valve as defined in claim 9, wherein the vent outlet includes a roundoff notch which is open in the initial shutoff position and closed in the final shutoff position.

* * * * *